United States Patent

[11] 3,556,368

| [72] | Inventor | Vidal Lucien René |
| | | Latresne, France |
| [21] | Appl. No. | 758,814 |
| [22] | Filed | Sept. 10, 1968 |
| [45] | Patented | Jan. 19, 1971 |
| [73] | Assignee | Societe a Responsabilite Limitee de Projets et Realisations de Materiel "Promat," Latresne, France a French company |
| [32] | Priority | Sept. 15, 1967 |
| [33] | | France |
| [31] | | No. 121272 |

[54] ARRANGEMENT FOR THE FEED OF WORKPIECES IN A MACHINE TOOL
5 Claims, 6 Drawing Figs.

[52] U.S. Cl. .................................................. 226/11, 226/43, 226/115; 83/208
[51] Int. Cl. ........................................................ B65h 25/32
[50] Field of Search ........................................... 226/43, 9, 37, 11, 115; 83/208, 80, 369

[56] References Cited
UNITED STATES PATENTS

| 3,332,084 | 7/1967 | Wahrer et al. ............... | 226/9X |
| 3,406,601 | 10/1968 | Clifford ........................ | 83/208X |
| 3,448,647 | 6/1969 | Miller et al. ................. | 83/208X |

*Primary Examiner*—Allen N. Knowles
*Attorneys*—Robert E. Burns and Emmanuel J. Lobato ABSTRACT: The invention is of feed and control means for feeding elongated workpieces in series through one or more machine tools intermittently, when machining operations (for example drilling) are to be performed thereon at predeterminedly spaced stations whilst the workpiece is stationary, and it resides essentially in combined feed and measuring means, the latter affording signals which control the feed: means are included to ensure passage of a sequence of separate workpieces.

PATENTED JAN 19 1971

3,556,368

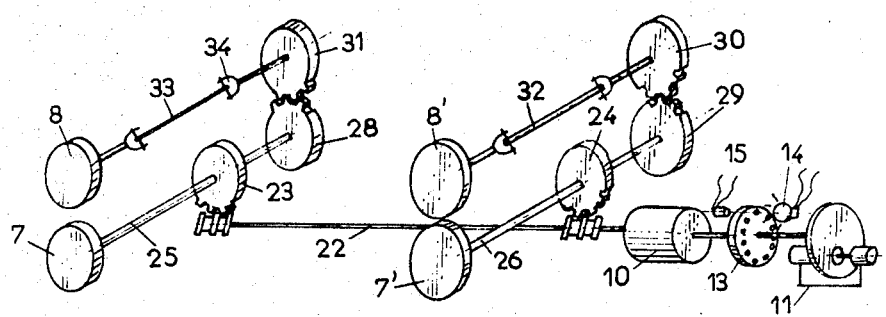

ARRANGEMENT FOR THE FEED OF WORKPIECES IN A MACHINE TOOL

The present invention is concerned with arrangements for feeding a machine tool with workpieces, more particularly with strips, bars, or sections and other analogous material.

The invention relates to the kind of apparatus which is for the intermittent feeding of a series of elongated workpieces through a machine tool (or tools) of which the operation (or operations) is required to be performed on such workpieces when static, at stations which are predeterminately spaced lengthwise of the workpiece; and in which consequently the series is to be fed in immediate sequence, and stopped and started, and the operations performed, automatically. Typical of such operations are punching, drilling, parting-off; and typical of workpieces are metal strip, bar, or so-called section material such as channel-sectioned strip. For brevity such machine tools will be called "repetition machines" and the workpieces will be referred to as "bars." The terms "upstream" and "downstream" are employed in their metaphorical sense to relate to the sense of direction of flow of the bars through the repetition machines.

There are known automatic arrangements associated with repetition machines comprising, for example, a motor-propelled carriage associated with a measuring system, and moving the bar by gripping it to pull it through different machines, the carriage stopping at locations which correspond to the stations at which one or other of the machines is to perform an operation on the bar. Such arrangements require after the machining of a workpiece, an empty return of the carriage, which corresponds to a loss of time. Furthermore the movement of the carriage involves a precision-made rack of which the cost is high. The pulling grip, to accompany the workpiece right to the last machine tool must traverse preceding machines, which always presents practical difficulties because the grip is an obstacle necessarily above the section of the workpiece. Finally the presence of cables and flexible elements accompanying the carriage is also very restrictive.

The arrangement according to the present invention affords a remedy for all these inconveniences, in eliminating the carriage, the engaging grip, the rack and the mobile cables and flexible elements.

The arrangement is essentially characterized by the fact that it comprises two pairs of transport and measuring rollers disposed separatedly in relation to the machine tool or tools and provided in such a way that the downstream rollers take charge of the transport and measurement of the workpiece when it escapes from the upstream rollers or slightly before such escape.

The downstream rollers then taking charge of the transport and measurement of the workpiece previously afforded by the upstream rollers, there is no need to provide any other means of transport passing the machine tool or tools.

In order to control this function of taking charge of transport and measurement by the downstream pair of rollers, the invention provides an association of a signalling emitter with the upstream pair of rollers, emitting a signal which controls the taking over of the workpiece by the downstream pair of rollers and the simultaneous disengagement of the upstream pair of rollers; this signal emitter may be a microswitch controlled by the workpiece and disposed preferably before the upstream pair of rollers; so that when the workpiece quits the microswitch the upstream pair of rollers disengages the workpiece which thereafter is only engaged by the downstream pair of rollers.

Following one advantageous form, the two rollers of a pair are on parallel axes, one of the rollers preferably the lower, being the transport roller and the other, upper, roller which is the pressure roller being the measurer, and with the latter is associated a measurement detector capable of emitting at predetermined intervals signals used to control the operation of the roller motors. By the signals may be controlled an arrangement affording stopping of the workpiece at predetermined stations in the different machines for the desired operations to be performed.

Advantageously each transport roller is coupled to the shaft of a motor which is associated with a braking arrangement, the invention including realizations wherein there is only one motor controlling the two transport rollers and only one detector is associated with the two measuring rollers.

Generally, the transport roller is mounted on a shaft rotatable in a structure in which is movable the bearing block of the corresponding measuring roller, means being provided to apply to the block a force towards the transport roller which ensures good nonslipping engagement of the workpiece. Preferably the bearing block of the measuring roller is movable in a slideway provided in the structure and it is controlled by a hydraulic jack.

The measuring detector may, according to one particular mode of realization of the invention, comprise a disc keyed on the shaft of the measuring roller (or a shaft positively rotating therewith), provided with peripheral apertures and arranged between a light source and a photoelectric cell, the electrical impulses thereby emitted being applied to a counter, preferably electronic, to control the electrical supply to the transport roller motor as well as to the brake.

According to a variant the measuring rollers do not act as pressure rollers in conjunction with the transport rollers each being associated with an idle roller, and being frictionally driven by the workpiece.

In the case where a single motor with which a brake is associated controls the two transport rollers several variants may be provided.

Thus, the two transport rollers are driven by the single motor, through the medium of a worm driven by the motor and engaging worm wheels keyed on the shafts of the transport rollers which carry pinions engaging pinions keyed on the shafts of the measuring rollers, the detector being associated with the motor shaft.

According to a first example, the shafts of the measuring rollers carry worm wheels which is fast the apertured disc between the light source and the photoelectric cell.

According to another example the shafts of the transport rollers carry worm wheels, engaged by a worm driven by the motor and the shaft of each measuring roller is associated with a detector.

According to a further example each measuring roller is independent of the transport rollers instead of being its complementary pressure roller, and each of them is associated with an idle roller driven by the movements of the workpiece.

Other characteristics and advantages of the arrangement of the invention emerge in the following description, by way of example, with reference to the annexed drawings, in which:

FIGS. 3 to 6 are schematic views representing variant arrangements according to the invention.

Figure 1:
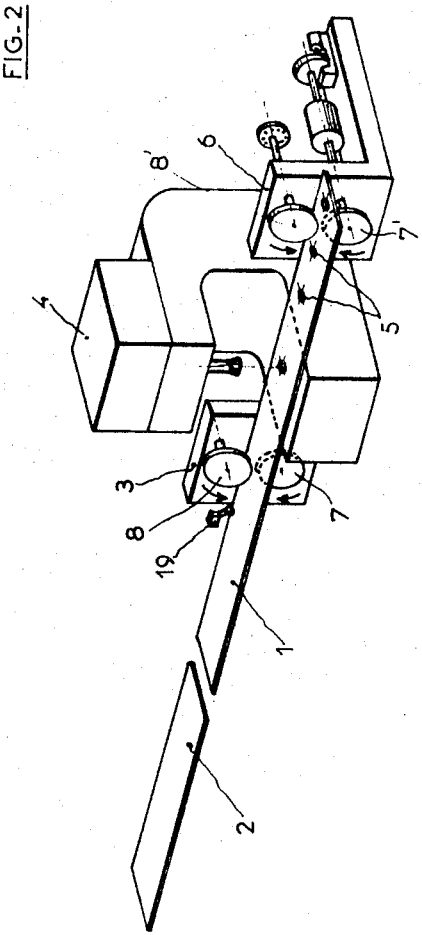
FIG. 1 represents schematically, in perspective, the principle grouping conforming to the invention.

In FIG. 1 the bar 1 which is the workpiece is followed by another bar 2 which will be machined in sequence after the first bar has been machined. The bar 1 is shown as having been entered between the pair of rollers 7, 8 rotatably borne in the upstream engagement designated at 3. These rollers 7 and 8 are rotatable by means described hereafter, in the sense of the arrows in the drawing, and in rotating, they entrain the bar 1 before (i.e. upstream of) the milling machine 4. Each time that the tool operation is required at a determined station of the bar 1, the rollers 7, 8 stop and immobilizes the bar 1; the machine 4 accomplishes the necessary operation, for example punching one of the holes 5 shown in the drawing. After each tool operation, the rollers 7, 8 causes a further movement of the bar 1 through a previously determined distance; when this is achieved the rollers 7, 8 stop again, holding the bar in its new position in which the machine tool 4 performs a new machining operation on the bar. After the bar has passed its whole length, it escapes from the engagement at 3. Just before escaping from the rollers 7, 8 the detector 19 constitutes by a microswitch with an arm bearing on the workpiece bar 1 will detect the end of the bar 1 and will give the command to the engagement at 3 to liberate the bar 1 just after the downstream engagement at 6 has taken charge of the bar 1. This second engagement 6 which is constituted in manner identical with the engagement 3, comprises essentially the pair of rollers 7′, 8′ entrained rotating in the sense indicated by the arrows in the drawing, by means which will be described hereafter; the engagement at 6 discharges the bar 1 from the machine 4, after performing the same step transport function as the rollers 7, 8, that is to say that it will continue to control the stopping and starting of the bar for the machining operations, as was done by the rollers 7, 8.

Upon the taking over the bar 1 at the downstream engagement at 6 the preceding measurement made by the upstream engagement is effectively maintained by the downstream engagement at 6. In order that a measurement error will not be introduced upon the takeover of the bar by the pair of rollers 7′, 8′, it is necessary that the pairs of rollers 7, 8 and 7′, 8′ of the two engagements 3 and 6 be rotationally phased in the same manner. If for some reason this condition is not met, the resulting inconvenience may be reduced in that the measurements of the measuring rollers may be sufficiently small as referred to the degree of precision required in the machining of the bar.

It follows from the above that the bar 1 has been entirely taken over throughout the length of its passage through the machine 4, which allows of doing all the required machining operations at predetermined locations.

The machine 4 which is represented in the drawing as a punch, may be replaced by a gang of several tools to perform different operations on the bar 1. If the, or one of the operations be to cut the workpiece by a shear replacing the machine illustrated at 4, the part still engaged by the engagement 3 pushes ahead of itself the off-cut part.

When the upstream or trailing end of the bar 1 reaches the detector 19 it will no longer be possible to effect a cutting operation in that the engagement arrangement at 6 must be able to extract the bar 1. The minimum length of the last cut part of the bar is therefore the interval between the two engagement arrangements at 3 and 6. This is a minor inconvenience of the arrangement of the invention, since it is feasible to program the cutting operations in such a way that short pieces are at the forward end of the bar and the longest piece is at the finish of the bar.

When the bar 1 has been entirely machined, it is possible immediately to introduce the second bar designated by reference 2 and to recommence or continue the machining cycle.

Figure 2:
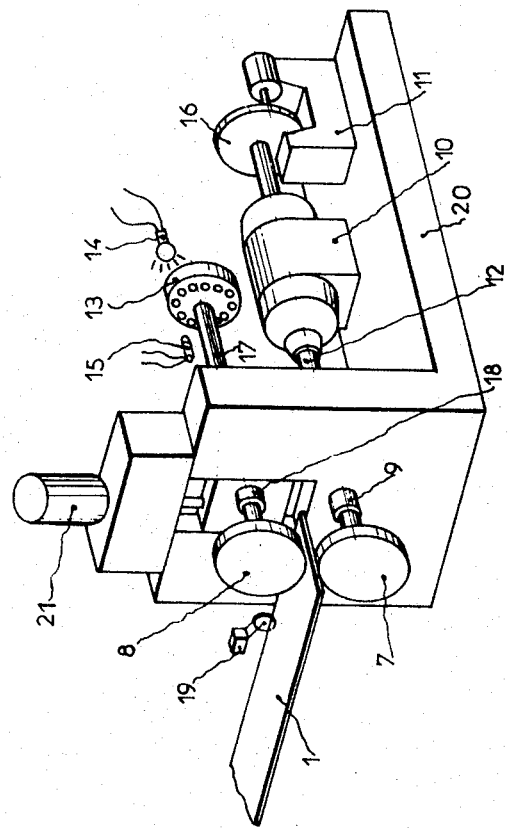
FIG. 2 is a perspective view on larger scale, of one form of realization of a pair of rollers.

FIG. 2 represents in detail one form of realization of the engagement arrangement 3.

This comprises a structure having virtually, in this form of realization, and L-shape; on the horizontal limb 20 of the structure are mounted a motor 10 and a disc brake 11, the disc 16 of this brake being keyed on the motor shaft.

On the front part of the shaft 12 of this motor is keyed the transport roller 7 rotatable in the bearing block 9 fixed in the vertical limb of the structure. The motor 10 may be of any known type, for example, an electric or hydraulic motor. The brake 11 may also be of any known type, for example, a solenoid-actuated caliper brake as schematically indicated in FIG. 2. The drive of the transport roller 7 may be direct by a shaft 12, or be stepped down by any known type of reduction, for example, by a worm engagement.

The roller 8 is both the measuring roller and pressure roller; it is connected by its shaft 17 to a detector of measurement 13 which may be of any suitable type, for example, an apertured disc such as represented in FIG. 2, with a lamp 14 and a photoelectric cell 15 which allows measurement of its rotation by counting each aperture passage by means of any known counter, for example an electronic counter.

The roller 7 and the roller 8 are urged one toward the other by an appropriate system such, for example, as the hydraulic jack 21 represented in FIG. 2 which thrusts on the mobile bearing block 18 of roller 8. The bar 1 being between the two rollers 7 and 8 is therefore constrained to conform to the movements of the transport roller 7, and the measuring roller 8 to follow those of the bar 1.

The length-measurement information of the bar 1 provided by the detector assembly 13, 14, 15 registered by the counter, may then be compared with the longitudinal stations at which are to be performed the machining operations, by a known assembly, for example, a numerical electronic control and the control ordains the operational sequence of the motor 10, the stopping by the brake 11 and the action of the machine tool 4.

The arrangements for the engagements at 3 and at 6 may be virtually identical.

FIGS. 3 to 6 represent variants of execution of engagement arrangements.

In FIG. 3, a single motor 10, a single detector arrangement 13, 14 and 15, and a simple braking arrangement 11 are used for the two pairs of rollers 7, 8 and 7′, 8′.

The motor 10 drives a worm 22 which engages respectively two worm wheels 23 and 24 keyed respectively on shafts 25 and 26 of transport rollers 7, 7′; on the same shafts are keyed respectively, pinions 28 and 29 which engage with pinions 31 and 30 respectively, on shafts 33 and 32 on which are keyed pressure and measuring rollers 8 and 8′, the shafts 32 and 33 being for preference shafts of a flexible type by virtue of universal joints such as represented by reference 34.

In the form of realization of FIG. 4, the motor 10 with which is associated the brake arrangement 11 drives a worm 35 which coacts with two worm wheels 36 and 37 keyed respectively on shafts 38 and 39 of transport rollers 7′ and 7. On the shafts 40 and 41 of the rollers 8 and 8′ are keyed two worm wheels 42 and 43 which coact with a worm 44 with which is associated the detector 13, 14 and 15.

In the form of realization of FIG. 5, the worm 35 driven by the motor 10 associated with the brake arrangement 11, coacts with two worm wheels 45 and 46; on the shafts 47 and 48 of the rollers 8 and 8′ are keyed respectively the discs 13′ and 13 of detector arrangements 14′, 15′ on the one hand and 14, 15 on the other hand.

Finally in the form of execution of FIG. 6, the transport rollers 7 and 7′ are totally independent of the measuring rollers 8 and 8′.

The transport roller 7 is rotatably engaged with the motor 10′ with which is associated the brake arrangement 11′, and the roller 7 coacts pressure roller $7_1$ for transport of the workpiece.

On the workpiece bears a measuring roller 8 with which is associated the detector arrangement 13, 14, 15.

The transport roller 7′ which is driven by the motor 10 with which is associated the brake arrangement 11, cooperates with the pressure roller $7'_1$ to ensure the transport of the workpiece; on the latter bears a measuring roller 8′ with which is associated the detector arrangement 13′, 14′, 15′.

I claim:

1. Apparatus for feeding and measuring elongated workpieces fed sequentially, to a machine tool performing repetitive operations on the workpieces comprising: a first pair of rollers upstream of a work station on a machine tool and driven intermittently for advancing therebetween individual workpieces, driven means for driving a roller of the first pair of rollers intermittently for advancing said individual workpieces through said work station at selected increments of length, a second pair of rollers disposed downstream of said work station for advancing the workpieces through said work station incrementally similarly to the first pair of rollers and subsequently to cessation of advancement by said first pair of rollers, second driven means for driving a roller of the second pair of rollers intermittently for advancing individual workpieces incrementally through said work station, and detection and control means detecting a downstream end of each individual elongated workpiece commanding the second driven means and second pair of rollers to advance the individual workpieces through said work station.

2. Apparatus according to claim 1, in which the first pair of rollers and the second pair of rollers each includes a measuring roller, means maintaining the measuring rollers of both pair of rollers in phase for accurately measuring the workpiece lengths, and measuring means responsive to said measuring rollers.

3. Apparatus according to claim 1, in which said detection means comprises means responsive to the presence or absence of a workpiece.

4. Apparatus according to claim 1, including for each pair of rollers an individual drive motor.

5. Apparatus according to claim 1, in which the first pair of rollers and the second pair of rollers each includes a measuring roller, and for each measuring roller means mounting the measuring rollers for bearing on the individual workpiece and functioning as pressure rollers.